May 23, 1950 P. HATCH ET AL 2,508,606
DIGGING BUCKET DEVICE
Filed April 29, 1946 2 Sheets-Sheet 1
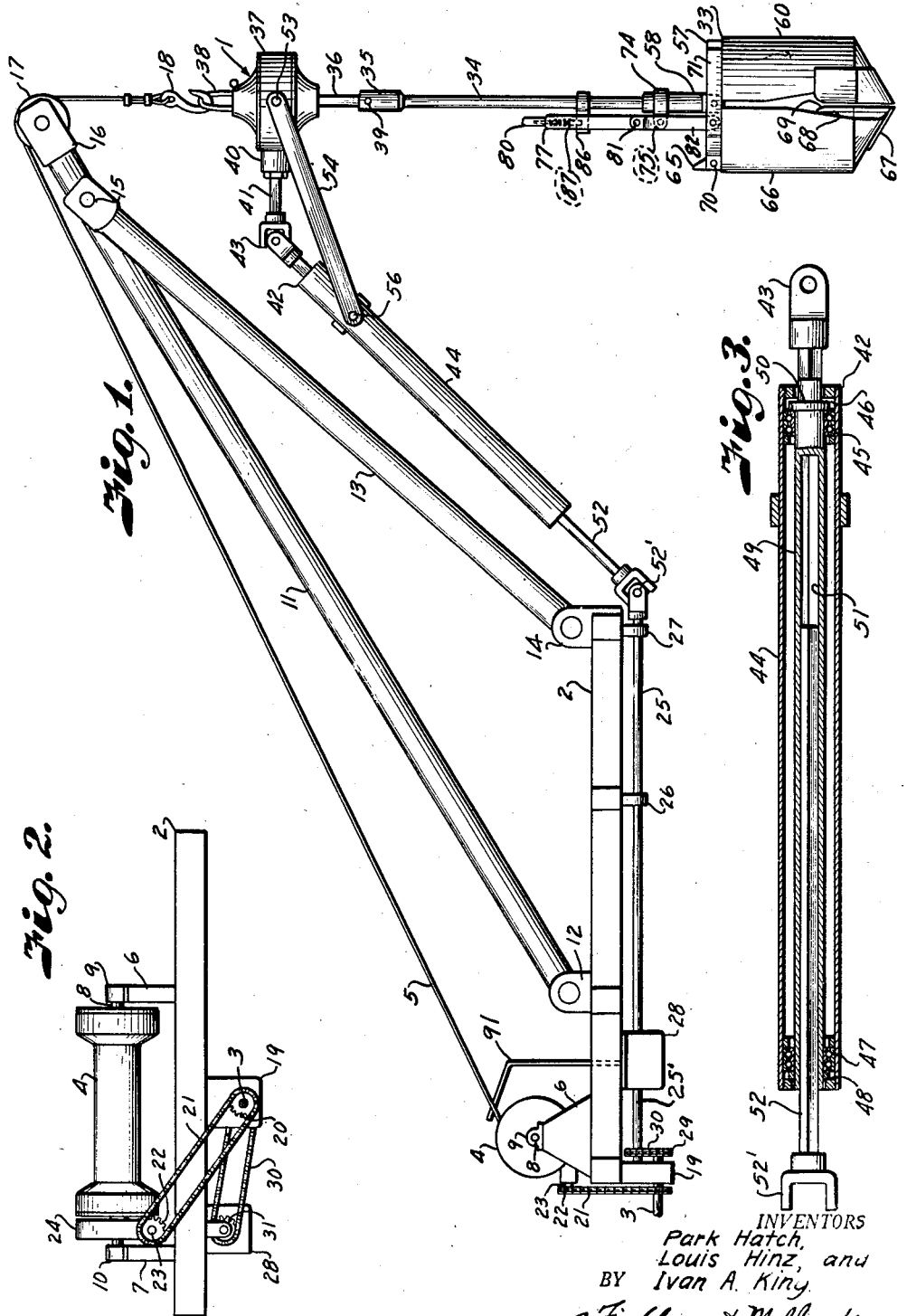
INVENTORS
Park Hatch,
Louis Hinz, and
BY Ivan A. King
Fishburn & Mullendore
ATTORNEYS

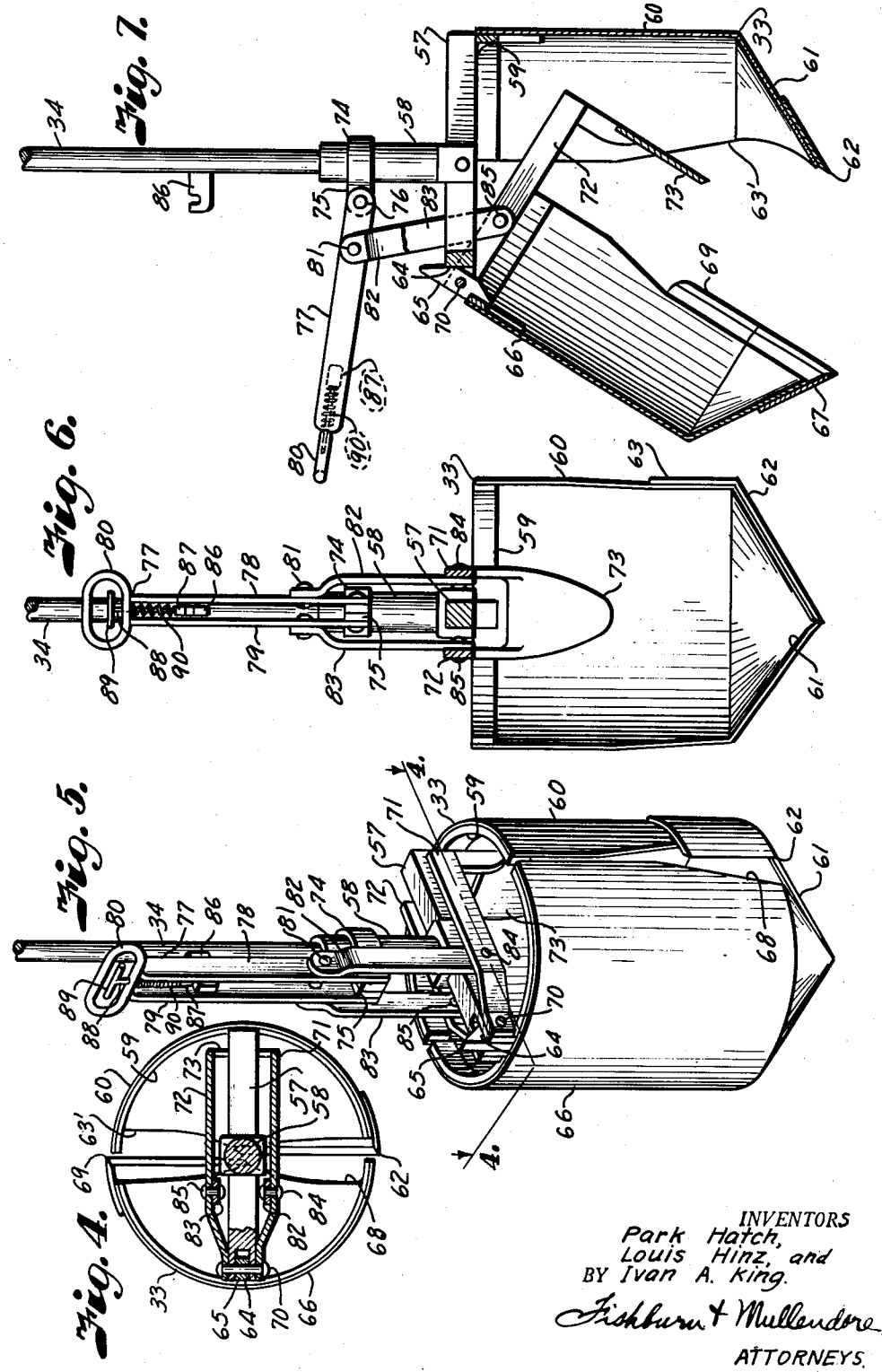

Patented May 23, 1950

2,508,606

UNITED STATES PATENT OFFICE 2,508,606

DIGGING BUCKET DEVICE

Park Hatch, Louis Hinz, and Ivan A. King, Horton, Kans.

Application April 29, 1946, Serial No. 665,839

2 Claims. (Cl. 255—67)

This invention relates to a digging device, and more particularly to a device for digging post holes or the like, which may be mounted on a vehicle such as a truck or tractor and operated from a power take off of such vehicle.

The principal objects of the present invention are to provide a digging device provided with a bucket adapted to be rotated for filling the same; to provide a device of this character having a two-piece bucket whereby by rotating the bucket the dirt or other material will fill the bucket and may be released therefrom; to provide a device of this character having a telescoping drive shaft for operating the digging bucket; to provide a digging device operated from a boom or frame attached to the bed of a truck so that the digging bucket will operate in a vertical condition regardless of the unevenness of the ground over which the truck is driven; to provide a device which will dig a hole at an angle from vertical position; and to provide a device of this character simple, economical to manufacture and efficient in operation.

In accomplishing these and other objects of the present invention, we have provided improved details of structure, the preferred form of which is illustrated in the accompanying drawings wherein:

Fig. 1 is a side view showing the details of our invention.

Fig. 2 is an elevational view particularly showing the winch for raising and lowering the digging bucket.

Fig. 3 is a cross sectional view through the telescoping drive shaft.

Fig. 4 is a transverse cross section taken on a line 4—4, Fig. 5.

Fig. 5 is a perspective view particularly illustrating the digging bucket.

Fig. 6 is an elevational front view showing the bucket in closed position.

Fig. 7 is a side elevational view partly in cross section showing the bucket in open position.

Referring more in detail to the drawings:

1 designates a digging machine embodying the features of our invention adapted to be carried on a truck bed or the like 2 and adapted to be connected to the drive shaft 3 of a power take off (not shown) on the truck.

Located on the truck bed near the power take off is a winch 4 on which a cable 5 is adapted to be wound. The winch 4 is mounted on the bed by brackets 6 and 7 by shaft 8 in bearings 9 and 10.

A boom or crane 11 is rigidly secured to the truck bed 2 by a bracket 12 located near the winch 4 and is provided with a brace arm 13 connected to the outer side of the truck bed by a bracket or the like 14 having its upper end attached to the boom 11 as indicated at 15. While we have here illustrated one brace member, additional brace members may be supplied to form a more rigid structure if desired. The upper end of the boom is provided with a yoke 16 adapted to receive a pulley 17 over which the cable 5 is run and is provided with a hook 18 for suspending the digging element as later described.

The drive shaft 3 from the power take off extends through a bearing member 19. Located on the outside of the bearing member is a sprocket wheel 20 adapted to receive a chain 21 leading to a sprocket wheel 22 carried by a shaft 23 connected to the winch 4 through suitable gearing contained in a housing 24 for driving said winch.

Also carried by the truck bed 2 and preferably located underneath the bed is a shaft 25 carried by bearings 26 and 27. The inner end of the shaft 25 extends into a variable speed transmission 28 located underneath the truck bed and near the power take off. A short shaft 25' extends from the transmission to the bearing box 19. Located on the shaft 3 on the inner side of the bearing box 19 on the power take off is a sprocket 29 over which a chain 30 runs to a sprocket 31 on the short shaft 25' for driving the shaft 25 as will later be shown.

33 designates a digging device or bucket of auger type having a rod 34 connected to its upper side provided with a socket 35 having a square opening adapted to receive a short shaft 36 leading from a transmission gearing (not shown) in a housing 37 adapted to be suspended from the hook 18 by a bail or the like 38. The short axle or shaft 36 may be provided with a square end to fit in the square socket 35 and fastened thereto by a suitable pin or the like 39. Leading from one side of the transmission housing 37 is a bearing member 40 accommodating a short shaft 41 connected to a telescoping driving member 42 by universal joint 43.

The driving member 42 comprises a sleeve or the like 44 having a double bearing member 45 at its upper end and a packing 46. It is also provided at its opposite end with a suitable bearing 47 and packing member 48. In the sleeve 44 is a shaft 49 having an annular flange 50 adapted to engage in the double bearing 45 on the end of the sleeve. The shaft 49 is provided with a substantially square bore opening 51 adapted to receive a square shaft 52 for telescoping in the tubular shaft 49 as will later be shown, and is connected to the drive shaft 25 by universal joint 52'.

The transmission housing 37 is provided on the respective sides with trunnions 53. Pivotally connected to the trunnions 53 are arms 54 having their opposite ends pivotally connected to the sleeve 44 near the upper end thereof by trunnions 56 to which the arms 54 are pivotally secured.

The two-piece digging bucket 33 consists of a bar 57 rigidly secured to a connecting member 58 to which the rod 34 is rigidly secured in a suitable manner. One end of the cross bar 57 is provided with a semi-circular depending flange 59 to which is rigidly secured by welding or other suitable means a semi-circular bucket piece 60 forming one-half of said auger bucket, the lower portion being provided with a tapered or semi-conical portion 61. The semi-circular bucket portion forms one-half of the auger and is provided with a cutting edge or blade 62 which extends outwardly from the semi-circular auger portion slightly as indicated at 63 (Fig. 6), its opposite side being cut away slightly as indicated at 63' to allow the material to load the bucket.

The front end of the cross bar 57 is slotted as indicated at 64 (Fig. 5) and adapted to receive a lug 65 which is attached to a semi-circular auger member 66 substantially identical with the auger member 60 just above described, the lower conical portion of the auger member being provided with a cutting blade 67, and one edge being cut away as indicated at 68 and the opposite side being extended outwardly as indicated at 69 to allow the auger to loosen the dirt and raise it into the bucket. The semi-circular bucket member 66 is pivotally secured to the cross bar 57 by the lug 65 and held in place by a bolt 70. Also pivotally secured to the cross bar 57 by bolt 70 are arms 71 and 72 extending substantially parallel to the bar 57 and provided on their outer ends with a depending paddle member 73 for loosening and removing dirt from the bucket as later described.

A collar 74 is rigidly secured to the connecting member 58 and has outwardly extending arms 75 to which is pivotally secured by a bolt 76 a lever 77 comprising spaced bars 78 and 79 provided at their free ends with a handle member 80. Near the lower end of the lever member pivotally secured by bolts or the like 81 are links 82 and 83 having their lower ends pivotally connected to the arms 71 and 72 respectively by bolts or the like 84 and 85 for a purpose later described.

A hook 86 is rigidly secured to the rod 34 adapted to receive a latch member 87 comprising a rod 88 extending through an opening in the handle member 80 and having a cross bar 89 comprising a handle for disengaging the latching member from the hook. A coil spring 90 is provided on the rod 88 to exert tension on said latching member.

Operation of a device constructed and assembled as described is as follows:

When the truck is driven to the desired location the bucket 33 may be lowered to the ground by operation of the winch 4 by operating the transmission 28 by operation of lever 91 (Fig. 1), thus allowing the cable 5 to roll over pulley 17. Further manipulation of the lever 91 will cause rotation of the drive shaft 25 by sprocket and chain 30 leading to the short shaft from the power take off and transmission. Operation of drive shaft 25 will cause rotation of telescoping drive shafts 52 and 49 respectively, which in turn operates the drive shaft 41 leading to the gearing in transmission housing 37 to rotate the axle 36 and rod 34, thus causing the bucket 33 to rotate to fill the same with dirt to be removed from the hole during the digging operation.

Before start of the digging operation the lever 77 is in engagement with the hook 86 and when the bucket is filled with material operation of the winch raises the bucket through cable 5 to remove it from the hole. The material may be removed from the bucket by unlatching the latching member 87 through handle 80, the lever 77 being pulled outwardly by handle 80, and the links 82 and 83 having their lower ends fastened to the arms 72 and 73 will cause the semi-circular bucket member 66 to pivot on the pin 70 so that the material will be dumped from the bucket when the device is in the position shown in Fig. 7, the paddle member 73 aiding in removing the dirt from the bucket should there be an inclination for it to stick thereto. The bucket may then be closed by raising of the lever 77 again to latching position.

It will be obvious from the foregoing that the digging device proper is normally operated in a vertical position due to the telescoping driving member 42, the square rod 52 and tubular rod 49 being telescoped together when the device is operating in a more horizontal position, but if the bucket is raised, the telescoping members will be extended outwardly and conversely should it operate below the horizontal position, so that the bucket will operate in any position.

It will also be obvious that if desired the hole may be dug at an angle by holding of the rod 34 in such angle position, the pivoted connection of the transmission gearing in housing 37, universal connections 43 and 52' and arms 54 rotating the bucket in any position. When the bucket is raised from the hole it can be removed by hand to one side of the hole to dump the dirt or other material therefrom.

It will further be obvious that our invention may be adapted for various uses without departing from the spirit of our invention, and the construction and mounting may be modified and still be within the scope of the present invention.

What we claim and desire to secure by Letters Patent is:

1. A drilling bucket for earth boring machines having a rotatable shaft comprising, a bar suspended from the rotatable shaft, a pair of semi-cylindrical shell members, one of said shell members being rigidly secured to one end of said bar and the other pivoted on the other end of said bar, semi-conical drilling heads joining the bottoms of said shell members in angular relation therewith, each of said heads having cutting edges for cutting earth material, means on said heads to facilitate entering of said material into the shell members, arms pivotally mounted on the end of said bar with the pivoted bucket piece and extending parallel with said bar, a paddle on the free ends of said arms, a lever pivotally mounted on said shaft above said bucket pieces, and links having one end secured to said lever and their opposite ends to said paddle arms for releasing said material from the bucket upon manipulation of said lever.

2. A drilling bucket for earth boring machines having a rotatable shaft comprising, a bar suspended from the rotatable shaft, a semi-circular flange rigidly secured to and depending from one end of the bar, a semi-circular bucket piece rigidly secured to said flange, a second semi-circular bucket piece pivotally secured to the opposite end of said bar, semi-conical heads joining the bottoms of the semi-circular bucket pieces in angular relation therewith, said heads having cutting edges for cutting earth material, means on said heads to facilitate entering of said material into the bucket pieces, arms pivotally mounted on the end of said bar with the pivoted bucket piece and extending parallel with said bar, a paddle on the free ends of said arms, a lever pivotally mounted on said shaft above said bucket pieces, links having one end secured to said lever and their opposite ends to said paddle arms for releasing said materials from the bucket upon manipulation of said lever, latch means for holding the pivoted bucket piece in closed position, and means for releasing said latch means.

PARK HATCH.
LOUIS HINZ.
IVAN A. KING.

REFERENCES CITED

The following references are of record in the file of this patent:

UNITED STATES PATENTS

| Number | Name | Date |
|---|---|---|
| 76,752 | Hale | Apr. 14, 1868 |
| 1,507,236 | Humiston | Sept. 2, 1924 |
| 1,663,833 | Genung | Mar. 27, 1928 |
| 1,926,325 | Bertran | Sept. 12, 1933 |
| 2,321,680 | Houston | June 15, 1943 |
| 2,371,563 | Walter | Mar. 13, 1945 |